Patented Apr. 27, 1954

2,676,872

UNITED STATES PATENT OFFICE 2,676,872

MEANS AND TECHNIQUE OF WORKING WITH SULFUR DIOXIDE

Marcel Jean Viard, Bois-Colombes, France, assignor to Societe Anonyme des Manufactures des Glaces et Produits Chimiques de Saint-Gobain, Chauny & Cirey, Paris, France No Drawing. Application January 2, 1951,
Serial No. 204,087

Claims priority, application France
January 3, 1950

7 Claims. (Cl. 23—178)

This invention relates to the manufacture and use of sulfur dioxide and to a new composition of matter containing sulfur dioxide. The invention also relates to the concentration and to the purification of sulfur dioxide. The invention also includes a means and method of transporting sulfur dioxide in such a way that it need not be compressed and requires a minimum of space. The invention also relates to a reaction medium in which certain sulfur dioxide reactions may be carried out.

Sulfur dioxide is a gas at room temperature weighing 2.97 grams per liter. In liquid form at 0° C. it has a specific gravity of 1.434, so that a liter will weigh approximately 1,434 grams. In order to ship it it must be sent in heavy containers capable of keeping it in liquid phase, which requires the paying of transportation charges on a material quantity of metal as well as a capital investment in such containers.

When sulfur dioxide is made, it is frequently generated by the roasting of sulfides, for instance any of the pyrites, and the gases which are discharged during the roasting are quite impure, the sulfur dioxide requiring both purification and concentration, which are sufficiently difficult and costly according to the methods of the prior art.

When sulfur dioxide is employed industrially most of its applications require the dissolving of the gas and various treatments and processings of the solutions, to the extent that one of the most important techniques of this industry concerns the preparation and use of those solutions. For example, with water, which is employed to dissolve the gas, it is practically essential to operate under pressure, which increases the expenditure of energy and complicates the apparatus. Another illustration of the difficulties attendant upon the use of sulfur dioxide is illustrated by the saline solution technique, in which the sulfur dioxide is dissolved in saline solutions, which are often unstable, which sometimes are chemically modified, and which deposit crusts in the apparatus. Organic solvents are expensive and are made more so by serious losses by entrainment.

It is an object of the invention to improve the handling of sulfur dioxide, to improve the storing of sulfur dioxide, to improve the purification of sulfur dioxide, to improve the concentration of sulfur dioxide, to make a new and superior composition of matter containing sulfur dioxide, and capable of use as a reaction medium or, alternately, capable of discharging its content of sulfur dioxide immediately without any substantial accompanying losses.

The objects of the invention are accomplished, generally speaking, by forming a composition of matter from glycol sulfite and sulfur dioxide at ice bath temperature, maintaining the composition at low temperature as long as it is desired to use or to keep the sulfur dioxide in that state, the mass being moderately heated when it is desired to obtain the sulfur dioxide in a purified and concentrated gaseous condition.

The invention finds its application in the first place in the extraction of sulfur dioxide from gaseous mixtures and act either to purify and/or to concentrate it. This phase of the invention is carried out by bringing the gaseous mixture in contact with glycol sulfite at a given temperature, which accomplishes a purification by the exclusion of other gases as the sulfur dioxide is absorbed to form the new composition of matter. The sulfur dioxide may be further purified by heating the composition of matter over the above mentioned temperature. During this heating all but a very little of the sulfur dioxide will have been expelled from the glycol sulfite, leaving other absorbed gases behind in the glycol sulfite. For example one can dissolve sulfur dioxide in glycol sulfite at 0° C. and recover sulfur dioxide by heating the solution at 50° C.

A liter of glycol sulfite at 0° C. will absorb 2,790 grams of sulfur dioxide, and even more if the temperature is carried lower. At the same temperature alcohol, a standard solvent, dissolves 859 grams. The applicant has observed that under these conditions of temperature sulfur dioxide gas is rapidly absorbed from any gaseous mixture put in contact with glycol sulfite.

In making the new composition of matter the gas may be bubbled through the glycol sulfite at low temperature or it can be passed countercurrent to glycol sulfite in a column, or the composition can be made by atomization or spraying of the liquid through the gas, which are illustrative methods. The temperature is kept as low as possible because the absorptive capacity of the glycol sulfite and sulfur dioxide rises with very great rapidity below 20° C. For example, at 20° C. one liter of glycol sulfite will absorb only 450 grams while at 0° it absorbs over 2,000 grams.

Sulfur dioxide is given up with equal ease as the composition of matter thus formed is heated. This process of first dissolving the sulfur dioxide from a gaseous mixture into the glycol sulfite and then expelling it from the composition by temperature change is very useful in producing a pure and concentrated $SO_2$ from a dilute mixture. For example, the gas issuing from the roasting of sulfides, such as the various pyrites, is very impure and frequently is very low in $SO_2$ content. The process produces, from such impure mixtures, pure $SO_2$, or industrial grade sulfur dioxide pure enough to be capable of being liquified and of the various uses required of sulfur dioxide.

The invention provides for the storing of sulfur dioxide under conditions of refrigeration rather than of pressure.

In addition to what has been said before, this composition of matter comprised of sulfur dioxide and glycol sulfite can be used in various applications in industry where this gas is useful, for example, in refrigeration.

The reheating of the composition of matter to regenerate the gas may conveniently be made by means of a heat exchanger in which the cold composition of matter is raised in temperature and gives up sulfur dioxide, while the degassed glycol sulfite is cooled down. The gas containing $SO_2$, as it is brought into contact with the glycol sulfite, for absorption and the making of the composition of matter, should be dry in order to avoid the hydrolysis of glycol sulfite by entrained water vapor. The composition of matter is liquid.

The absorptive capacity of glycol sulfite for $SO_2$ approximately 0 at 120° C., attains 75 grams per liter at 80° C., 150 grams per liter at 60° C., 317 grams per liter at 40° C., 634 grams per liter at 20° C., 1230 grams per liter at 10° C., and 2790 grams per liter at 0° C. This scale of values permits one to release from the composition of matter a selected quantity of gaseous $SO_2$ by the simple expedient of raising its temperature to a selected level.

The composition and process set forth herein have none of the imperfections that characterize the prior art and the aqueous, saline, or organic solutions therein employed. It is infinitely superior in relation to organic solvents. It deposits no crusts, and enters no reactions, contrary to the saline solution practice. It operates at ordinary pressure and with great capacity as distinguished from the elevated pressure employed with the water technique. For its own part, the new process operates to purify and concentrate sulfur dioxide by temperature control over a very limited range of temperatures. The boiling point of glycol sulfite is 170° C., whereas the total process can be carried out at not over 100°, at which point the glycol sulfite will retain not over 42 grams per liter of $SO_2$, a temperature far below the boiling point of glycol sulfite so that losses by entrainment are trivial or nonexistant.

As many apparently widely different embodiments of the present invention may be made without departing from the spirit and scope thereof, it is to be understood that the invention is not limited to the specific embodiments.

What is claimed is:

1. The method of handling $SO_2$ that comprises mixing it with glycol sulfite at ice bath temperature, and storing the mixture under refrigeration to a temperature on the order of 0–20° C.

2. The method of producing, concentrating and purifying $SO_2$ gas that comprises roasting a sulfide, bringing the gases therefrom into contact with ice cold glycol sulfite until the glycol sulfite is charged, and heating the charged glycol sulfite to about 100° C.

3. The method of purifying and concentrating gases comprising sulfur dioxide that comprises passing said gases into glycol sulfite at low temperature on the order of 0–20° C. until the glycol sulfite is charged, and raising the temperature of the glycol sulfite until the sulfur dioxide is discharged.

4. The method of carrying out $SO_2$ reactions that comprises bringing a material, capable of being reacted with $SO_2$, into contact with a liquid consisting in its essential ingredients of glycol sulfite charged with a substantial quantity of sulfur dioxide, at a temperature below about 20° C.

5. The method of reacting $SO_2$ with a substance capable of reacting therewith that comprises dissolving $SO_2$ in glycol sulfite at ice bath temperature, to form a reaction medium, and mixing said medium with the substance capable of reacting with $SO_2$ at such temperature.

6. The method of handling $SO_2$ that comprises mixing it with glycol sulfite at a temperature below about 20° C. and transporting the mixture at a temperature below 20° C.

7. The method of removing $SO_2$ from gases containing it and of concentrating the $SO_2$ that comprises passing such gases into glycol sulfite at a temperature below about 20° C. until the glycol sulfite is charged and discharging $SO_2$ therefrom by raising the temperature of the glycol sulfite to a selected degree above 20° C.

References Cited in the file of this patent

UNITED STATES PATENTS

| Number | Name | Date |
| --- | --- | --- |
| 1,091,689 | Moore et al. | Mar. 31, 1914 |
| 1,893,385 | Wettstein | Jan. 3, 1933 |
| 1,932,903 | McKee | Oct. 31, 1933 |
| 1,972,074 | Boswell | Sept. 4, 1934 |